United States Patent Office 3,471,405
Patented Oct. 7, 1969

3,471,405
MINERAL LUBRICATING OIL CONTAINING A DIENE POLYMER HAVING TERMINAL HYDROXYL GROUPS AND HALOGEN AND OXYGEN-CONTAINING GROUPS
Donald D. Carlos, Crown Point, Ind., and David W. Young, Homewood, Ill., assignors to Sinclair Research, Inc., New York, N.Y., a corporation of Delaware
No Drawing. Filed Apr. 7, 1967, Ser. No. 629,073
Int. Cl. C10m 1/28
U.S. Cl. 252—54.6
10 Claims

ABSTRACT OF THE DISCLOSURE

A composition useful as a cutting oil and containing a major amount of mineral lubricating oil and about 1 to 50 weight percent for example, of an oxygen-containing, halogenated polymer of a diene hydrocarbon (e.g. 1,3-butadiene) which polymer contains groups in the polymer chain of the structure:

wherein X is halogen (e.g. iodine) and Y can be —OH; —OR; or

R being a hydrocarbon radical of 1 to about 20 carbon atoms (e.g. methyl).

---

This invention relates to mineral lubricating oil compositions, especially cutting oils, which contain a diene polymer product.

We have found that certain mineral lubricating oil soluble, oxygen-containing halogenated diene polymer products when added to mineral lubricating oils, provide oil compositions particularly useful when machining or working metals. For instance, when employed in a metal-tapping operation, the oil compositions of the invention effect a substantial reduction in express tapping torque. The hydrocarbon nature of the diene polymer backbone of the polymer products permits blends to be made with a variety of base oil stocks. Further, because of the microstructure of the diene polymeric products the oil compositions of the present invention do not show undue drying rates and thus present no serious storage problems. In general, the diene polymer product-containing cutting oils of the present invention can be used in a wide range of machining operations such as drawing, extruding, tapping, reaming, broaching, grinding, threading, etc.

The oxygen-containing, halogenated diene polymer products used in the cutting oil compositions of the present invention can be obtained by the halogenation of diene polymers in the presence of certain oxygen-containing compounds. The diene polymer derivatives are characterized by the presence of groups in the polymer chain of the following structure:

wherein X is halogen, Y is —OH, —OR or

and R is aliphatic, including cycloaliphatic, aromatic or mixed aliphatic-aromatic radical of 1 to about 20, preferably 1 to about 12, carbon atoms. The useful halogens have atomic numbers from 17 to 53, i.e., chlorine, bromine and iodine, the latter being preferred. The halogenated diene polymer derivatives containing groups of the above structure can be prepared by halogenating the diene polymer in the presence of, for example, water, alcohols or monocarboxylic acids, including their anhydrides, which supply the —OH, —OR and —OCOR groups, respectively. Suitable oxygen-containing compounds for producing the halogenated diene polymer products of the character described include water; monohydric alcohols such as methanol, ethanol, isopropanol, 1-butanol, 2-butanol, isobutyl alcohol, 1-pentanol, 2-pentanol, 3-pentanol, the hexanols, such as 1-hexanol, 2-hexanol, etc., isoheptyl alcohol, and octanol; phenols such as phenol and various alkyl and alkoxy derivatives of phenols, such as di- tert-amylphenol, the o-, m-, and p-cresols, the xylenols such as 2,3-, 2,4-, 2,5-, 2,6-, and 3,4-xylenols, p-tert-butylphenol, o-butoxyphenol, p-methoxyphenol, etc.; monohydroxy naphthalenes such as 1-naphthol and 2-naphthol; monohydroxy cycloalkanes such as cyclohexanol, etc.; monocarboxylic acids and the anhydrides thereof, such as acetic, propanoic, butanoic, 2-methylpropanoic, pentanoic, hexanoic and octanoic acids, acetic anhydride, propanoic anhydride, benzoic anhydride, etc.; and like compounds.

Suitable diene polymers for the halogenation reaction include liquid polybutadiene resins obtained by the various catalytic diene polymerization processes, for example, liquid polybutadiene resins prepared by processes employing a sodium catalyst such as the process described in U.S. Patent 2,631,175 to Crouch, or a BF₃-etherate catalyst system, such as the process described in U.S. Patent 2,708,639 to Miller. Often the polymers have molecular weights of up to about 10,000, preferably about 1000 to 5000, but in any event they must, after halogenation, be soluble in the base mineral oil at least to an extent sufficient to provide the desired characteristics to the oil.

The preferred diene polymer used to prepare the novel polymer products of the present invention is a hydroxyl-containing polymer oil generally having on the average at least about 1.8 predominantly primary, terminal, i.e., attached to a terminal carbon atom, hydroxyl groups per polymer molecule. Most advantageously, the polymer has greater than two average allylic, terminal hydroxyl groups, e.g., at least 2.1 to, say 2.6, or even 3 or more. Also, two terminal hydroxyls are generally separated by a long carbon-carbon chain. Determined as milli-equivalents of potassium hydroxide equivalent to the hydroxyl content of one gram of polymer, the polymers will often have a hydroxyl value of about 0.5 to 1.5, preferably 0.7 to 1.0.

The hydroxyl-containing diene polymers used in the present invention may have number average molecular weights in the range of about 200 to 10,000 (Staudinger) and viscosities at 30° C. of about 5 to 20,000 poises and may be prepared using a hydrogen peroxide catalyst. This free-radical addition polymerization can take place in a mutual solvent system; that is, one which dissolves both the diene monomer and the hydrogen peroxide. Suitable solvents are isopropanol, acetone, methanol, sec-butanol, n-butanol, n-propanol and the like alcohols having 2 to about 12 carbon atoms. The H₂O₂-solvent system is found to supply hydroxyl groups and the catalytic and solvent effects needed to produce the diene polymers of desired chemical and physical characteristics. In such a polymerization system, the alcohol serves as a solvent for the peroxide and as a solvent or diluent for the diene monomer and is used in an amount suitable to promote adequately rapid but controllable polymerization of the monomer material in the solution to form the diene polymer. The alcohol should be free of any group which would interfere with the production of the diene polymer. Saturated alcohols are preferred and often those having about the same carbon atom content as the diene monomer will be found most useful. For example, when the monomer is butadiene, propanol or isopropanol may be preferred. The $H_2O_2$-alcohol system may also contain ketones, ethers, alcohol-ketones, alcohol-ethers and alcohol-esters which are miscible in water in all proportions and which do not contain polymerizable carbon-to-carbon unsaturation or otherwise interfere with polymerization or enter into the product. The peroxide material may be used in amounts of about 1 to 10 percent of the reaction mixture to assure a low molecular weight addition polymer product having the desired number of hydroxyl groups per molecule. The resulting hydroxyl-containing diene polymers are predominantly linear, i.e., 1,4-polymer in the case of butadiene-1,3 and thereby differ from those non-hydroxyl-containing diene polymers produced, for example, by sodium catalysis. The preferred diene polymers have the majority of their unsaturation in the main hydrocarbon chain.

The diene hydrocarbons which are employed to make the polymers are unsubstituted, 2-substituted or 2,3-disubstituted-1,3-dienes of up to about 12 carbon atoms. The diene preferably has up to 6 carbon atoms and the substituents in the 2- and/or 3-position may be hydrogen, alkyl, generally lower alkyl, e.g., of 1–4 carbon atoms, aryl (substituted or unsubstituted), etc. Typical dienes which may be employed are 1,3-butadiene, isoprene, chloroprene, 2-cyano-1,3-butadiene, 2,3-dimethyl-1,3-butadiene, etc.

Mono-olefinically unsaturated monomers may also be incorporated into the diene polymers used in this invention. Generally, they will be present only in minor amounts but may be present in up to about 40 percent by weight of the total monomers. Usable vinylidene monomers include alphamono-olefinic materials of about 2 or 3 to 10 or 12 carbon atoms such as styrene, vinyl toluene, methylmethacrylate, methacrylate, acrylic esters, acrylonitrile, vinyl chloride, etc.

The halogenation of the diene polymer in the presence of the oxygen-containing compound may be carried out by adding the desired halogen to a solution of the diene polymer and the oxygen-containing compound. Often the oxygen-containing compound, for example, an alcohol or anhydride, may serve as a solvent for the polymeric material but additional solvents such as benzene, toluene, heptane, etc., may be used in instances where water or low molecular weight alcohols, for example, are employed in the reaction. The reaction may be performed at room temperature and at atmospheric pressure for up to about 30 hours or more. However, if desired, elevated temperatures say up to about 100° C. or more and, if desired, superatmospheric pressures may be employed.

The oxygen-containing, halogenated diene polymer products are clear yellow oils which possess excellent oil solubility.

The amount of X and Y substituents, that is, the halogen and the —OH; —OR or OCOR substituents in the polymeric product of the halogenation reaction may vary depending upon reaction time, temperature and amounts of reactants employed. In general, however, the oxygen-containing, halogenated diene polymeric products will contain about 0.5 to 15, preferably about 1 to 5 weight percent halogen from the halogenation reaction and up to about a molar equivalent of Y group based on the halogen component of the polymer. These amounts of halogen and Y group are independent of any substituents, for example —OH, present on the base polymer prior to the halogenation reaction. Preferably, the number of Y groups added during the halogenation are approximately in molar equivalent to the halogen added.

The oils used as the base and major component in the cutting oils of the present invention are mineral lubricating oils. The oils used include the petroleum lubricating oils such as refined coastal oils and refined Mid-Continent oils. The oils may be refined by acid treatment, solvent extraction, hydrogenation or other procedures. Although various oils of lubricating viscosity can be used in the products of our invention, it is preferred to use a substantially anhydrous lubricating oil with a viscosity from about 50 to 2000 SUS at 100° F., preferably 70 to 500 SUS at 100° F. Good results have been obtained with an acid-refined coastal oil with a viscosity of about 100 SUS at 100° F.

The amount of the novel polymer product added to the base oil employed may depend upon the particular base oil employed and the machining operation in which the cutting oil is used. However, in all cases the amount will be that sufficient to enhance cutting, for example, effectively reduce feed force. Often the amounts will fall within the range of about 1 to 50 by weight, preferably about 2 to 10 by weight, based on the mineral oil. Additional optional additives may be used in small amounts in the cutting oil compositions of the invention such as bactericides, corrosion inhibitors, anti-foam agents, etc. Moreover, they may be used either alone or in combinations, for instance, in amounts of about 0.1–5 percent by weight.

The following examples further illustrate the present invention, but are not to be considered limiting.

Example I

To a glass bottle containing 10 parts of aqueous (50% by weight) hydrogen peroxide were added 70 parts isopropanol and 100 parts butadiene-1,3. The bottle was capped and placed in a steam pressure chamber and held at 118° C. for two hours. After cooling, the bottle was opened and the volatiles were removed, e.g., butadiene-1,3, butadiene dimer, isopropanol, acetone, residual hydrogen peroxide, water, etc. This removal was accomplished with the aid of heat and vacuum followed by steam and vacuum. The resulting product was a clear, viscous liquid polybutadiene having an hydroxyl value of 0.95 meq./g., about 2.2 terminal, allylic hydroxyl groups (predominantly primary) per molecule, a molecular weight of approximately 2200, a viscosity of 50 poises, and an iodine number of over 300.

Example II

To a solution of 250 g. of the polybutadiene oil prepared in Example I, 200 g. of methanol and 600 g. of benzene was added 9.5 g. iodine. The mixture was stirred for about 30 hours at a maximum temperature of 30° C. and a pressure of about 755 mm. Hg. The solvent was removed under reduced pressure and there was obtained a quantitative yield of the methoxyiodide derivative. Elemental analysis showed 3.37% iodine in the product.

Example III

Similarly, 10.0 g. of iodine is added to a rapidly stirred mixture of 250 g. of the polybutadiene oil prepared in Example I, 100 g. of water and 600 g. of benzene. The mixture is allowed to stir for about 24 hours at a maximum temperature of 30° C. and a pressure of about 755 mm. Hg. The solvent is removed under reduced pressure and there is obtained a quantitative yield of the iodohydrin derivative.

Example IV

Following a like procedure, 10 g. of iodine is added to a rapidly stirred solution of 250 g. of the polybutadiene oil prepared in Example I, 150 g. of acetic anhydride and 600 g. of benzene. The mixture is allowed to stir for about 24 hours at room temperature and atmospheric pressure. The solvent is removed under reduced pressure and there is obtained a quantitative yield of the iodoacetate derivative.

Example V

The methoxyiodide derivative obtained in Example II was evaluated for torque reduction properties by adding a small amount of the product to a mineral lubricating oil base stock and subjecting the resulting mixtures to a metal tapping test using 1117 SAE steel. For comparison, a test run was made initially using the mineral lubricating oil containing no polymer product. The base oil used in the tests was an acid refined coastal mineral lubricating oil having a viscosity of 100 SUS at 100° F. The results are listed below:

RESULTS OF TAPPING TESTS ON 1117 SAE STEEL

|  | Torque in inch-pounds |
|---|---|
| Acid-refined coastal oil (100 SUS at 100° F.) | 423 |
| 5% of methoxyiodide derivative in acid refined coastal oil (100 SUS at 100° F.) | 331 |

The results show that notable torque reduction is effected when tapping steel, as a result of the addition of a small amount of the oxygen-containing, halogenated diene polymer product to the base mineral lubricating oil. Different polymer product concentrations and base mineral oil stocks may be desirable, however, when the cutting oil compositions are employed in other industrial machining operations, such as drawing or extruding.

It is claimed:

1. A composition comprising a mineral lubricating oil base as the major component and an amount of a mineral oil-soluble, oxygen-containing, halogenated polymer of a diene hydrocarbon of 4 to 12 carbon atoms, said polymer prior to halogenation having at least about 1.8 predominantly, terminal hydroxyl groups and a molecular weight of up to about 10,000, said polymer containing as a result of halogenation, about 0.5 to 15 weight percent halogen, and an approximate molar equivalent, based on said halogen, of an oxygen-containing group selected from the group consisting of —OH, —OR, and

wherein R is a hydrocarbon radical of 1 to about 20 carbon atoms, said oxygen-containing group being in addition to the hydroxyl groups of the polymer before halogenation, said halogen having an atomic number of 17 to 53, and said amount being sufficient to improve the metal machining properties of said oil.

2. The oil composition of claim 1 wherein the polymer is present in an amount of about 1 to 50 weight percent of the mineral oil.

3. The oil composition of claim 2 wherein the oxygen-containing group is —OR and R is an aliphatic hydrocarbon radical of 1 to about 12 carbon atoms.

4. The oil composition of claim 3 wherein the halogen has an atomic number of 53.

5. A composition comprising a mineral lubricating oil base as the major component and about 1 to 50 weight percent of a mineral oil-soluble, oxygen-containing, halogenated polymer of a diene hydrocarbon of 4 to 12 carbon atoms, said polymer prior to halogenation having at least about 1.8 predominantly primary, terminal hydroxyl groups and a molecular weight of up to about 10,000, said polymer containing, as the result of halogenation about 1 to 5 weight percent halogen and an approximate molar equivalent, based on said halogen, of an oxygen-containing group on a carbon atom adjacent to a carbon bearing said halogen, said oxygen-containing group being in addition to the hydroxyl groups of the polymer before halogenation and being selected from the group consisting of —OH, —OR, and

wherein R is a hydrocarbon radical of 1 to about 20 carbon atoms, and said halogen having an atomic number of 17 to 53.

6. The oil composition of claim 5 wherein the polymer prior to halogenation has at least about 2.1 predominantly primary, allylic terminal hydroxyl groups per polymer molecule and a molecular weight of about 1000 to 5000.

7. The oil composition of claim 6 wherein the diene is 1,3-butadiene.

8. The composition of claim 7 wherein the halogen is iodine.

9. The oil composition of claim 8 wherein the polymer is present in an amount of about 2 to 10 weight percent.

10. The oil composition of claim 9 wherein the oxygen-containing group is —OCH$_3$.

References Cited

UNITED STATES PATENTS

| 2,137,777 | 11/1938 | Lincoln et al. | 252—54 |
| 2,792,382 | 5/1957 | Edmonds | 252—54 X |
| 3,278,433 | 10/1966 | Feng | 252—54 X |
| 3,392,118 | 7/1968 | Isaacson et al. | 252—54 X |

DANIEL E. WYMAN, Primary Examiner

W. CANNON, Assistant Examiner

U.S. Cl. X.R.

252—54, 55, 56